US012602268B2

(12) United States Patent
Vidal et al.

(10) Patent No.: US 12,602,268 B2
(45) Date of Patent: Apr. 14, 2026

(54) METHODS FOR EVENT PRIORITIZATION IN NETWORK FUNCTION VIRTUALIZATION USING RULE-BASED FEEDBACK

(71) Applicant: Telefonaktiebolaget LM Ericsson (publ), Stockholm (SE)

(72) Inventors: Allan Vidal, Indaiatuba (BR); Pedro Henrique Gomes Da Silva, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 499 days.

(21) Appl. No.: 17/422,685

(22) PCT Filed: Jan. 14, 2019

(86) PCT No.: PCT/IB2019/050280

§ 371 (c)(1),
(2) Date: Jul. 13, 2021

(87) PCT Pub. No.: WO2020/148569

PCT Pub. Date: Jul. 23, 2020

(65) Prior Publication Data

US 2022/0121504 A1      Apr. 21, 2022

(51) Int. Cl.
*G06F 9/54* (2006.01)
*G06F 9/48* (2006.01)

(52) U.S. Cl.
CPC ............ *G06F 9/542* (2013.01); *G06F 9/4831* (2013.01); *G06F 9/546* (2013.01); *G06F 2209/544* (2013.01)

(58) Field of Classification Search
CPC ........ G06F 9/542; G06F 9/4831; G06F 9/546; G06F 2209/544
See application file for complete search history.

(56) References Cited

U.S. PATENT DOCUMENTS

| | | | |
|---|---|---|---|
| 6,665,868 | B1 | 12/2003 | Knowles et al. |
| 7,379,993 | B2 | 5/2008 | Valdes et al. |

(Continued)

OTHER PUBLICATIONS

Ningwei Dai Yunpeng Chai Yushi Liang Chunling Wang; ETD-Cache: An Expiration-Time Driven Cache Scheme to Make SSD-based Read Cache Endurable and Cost-efficient; May 18-21, 2015; 8 pages (Year: 2015).*

(Continued)

*Primary Examiner* — Kevin L Young
*Assistant Examiner* — Kimberly L Jordan
(74) *Attorney, Agent, or Firm* — Weisberg I.P. Law, P.A.

(57) ABSTRACT

A method is implemented by an event collector to utilize feedback from an event handler to prioritize event forwarding to the event handler. The method includes receiving feedback from the event handler in response to a successful match-action in a rules engine, the feedback including a derived condition which is a generalized version of a condition stored in the match part of a rule, determining whether the derived condition is stored in an event prioritizer, and storing the derived condition in the event prioritizer with initial expiration timer and hit counter, in response to the derived condition not being present in the event prioritizer, and updating a hit counter and expiration timer of the derived condition in the event prioritizer, in response to the derived condition being present in the event prioritizer.

12 Claims, 9 Drawing Sheets

(56)          References Cited

U.S. PATENT DOCUMENTS

| | | | |
|---|---|---|---|
| 8,613,083 | B1 | 12/2013 | Njemanze et al. |
| 9,740,539 | B2 | 8/2017 | Okabayashi |
| 2002/0048269 | A1* | 4/2002 | Hong ..................... H04L 61/30 |
| | | | 370/386 |
| 2011/0119219 | A1 | 5/2011 | Naifeh et al. |
| 2012/0102503 | A1 | 4/2012 | Meijer et al. |
| 2024/0314169 | A1* | 9/2024 | Azad .................. H04L 63/1491 |

OTHER PUBLICATIONS

Lakshmish Ramaswamy and Ling Liu; An Expiration Age-Based Document Placement Scheme for Cooperative Web Caching; May 2004; 16 pages (Year: 2004).*

Muhammad Bilal and Shin-Gak Kang; A Cache Management Scheme for Efficient Content Eviction and Replication in Cache Networks; Feb. 16, 2017; 10 pages (Year: 2017).*

Bhagwat, et al., "Experience with NFV Architecture, Interfaces, and Information Models," Issue 1, ETSI, Open Source MANO, May 2018, pp. 1-38. https://osm.etsi.org/images/OSM_White_Paper_Experience_implementing_NFV_specs_final.pdf.

ETSI, "Network Function Virtualization (NFV); Management and Orchestration," ETSI GS NFV-MAN 001 v1.1.1, Dec. 2014, pp. 1-184. https://www.etsi.org/deliver/etsi_gs/NFV-MAN/001_099/001/01.01.01_60/gs_NFV-MAN001v010101p.pdf.

ETSI, "Network Functions Virtualisation (NFV) Release 2; Management and Orchestration; Or-Vnfm reference point—Interface and Information Model Specification," ETSI GS NFV-IFA 007 Feb. 2018, pp. 1-145. https://www.etsi.org/deliver/etsi_gs/NFV-IFA/001_099/007/02.04.01_60/gs_NFV-IFA007v020401p.pdf.

ETSI, "Network Functions Virtualisation (NFV) Release 2; Protocols and Data Models; RESTful protocols specification for the Ve-Vnfm Reference Point," ETSI GS NFV-SOL 002 v2.4.1 Feb. 2018, pp. 1-228. https://www.etsi.org/deliver/etsi_gs/NFV-SOL/001_099/002/02.04.01_60/gs_NFV-SOL002v020401p.pdf.

Sullivan, B., "VNF Event Stream," OPNVF Project Proposal, Atlassian Confluence Open Source Project License, Last Modified Jun. 20, 2016, downloaded from https://wiki.opnfv.org/display/PROJ/VNF+Event+Stream.

* cited by examiner

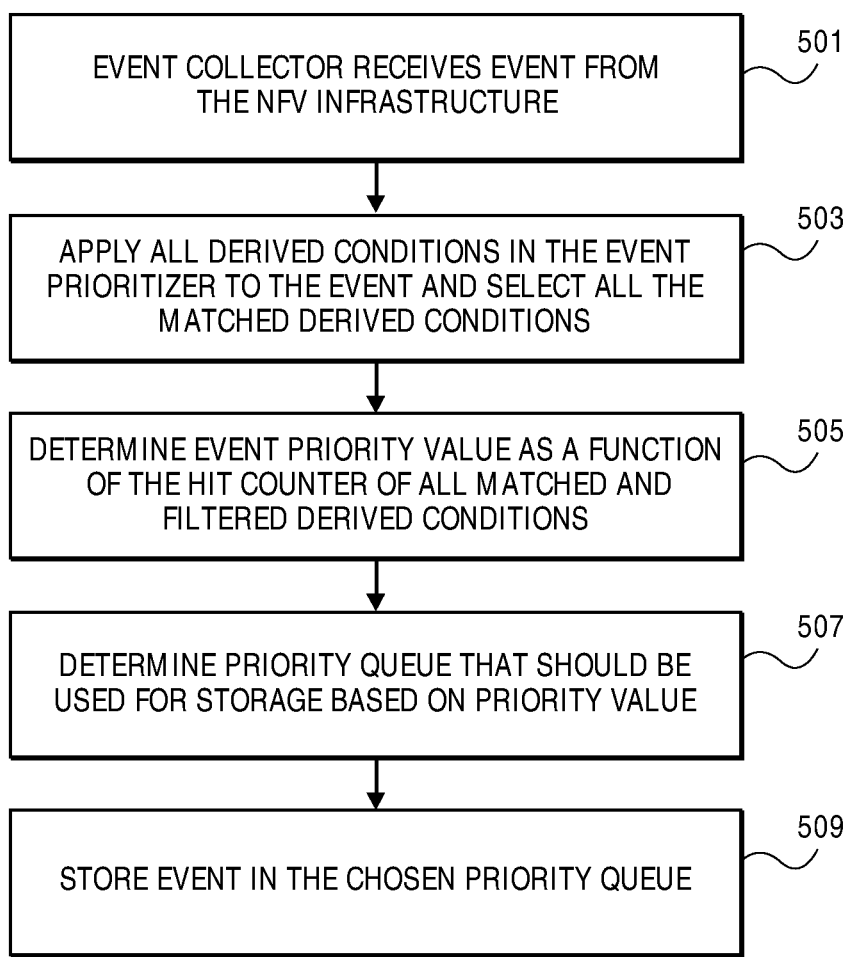

EVENT COLLECTOR RECEIVES EVENT FROM THE NFV INFRASTRUCTURE — 501

APPLY ALL DERIVED CONDITIONS IN THE EVENT PRIORITIZER TO THE EVENT AND SELECT ALL THE MATCHED DERIVED CONDITIONS — 503

DETERMINE EVENT PRIORITY VALUE AS A FUNCTION OF THE HIT COUNTER OF ALL MATCHED AND FILTERED DERIVED CONDITIONS — 505

DETERMINE PRIORITY QUEUE THAT SHOULD BE USED FOR STORAGE BASED ON PRIORITY VALUE — 507

STORE EVENT IN THE CHOSEN PRIORITY QUEUE — 509

FIG. 5

EVENT COLLECTOR DETERMINES (SYNCHRONOUSLY OR ASYNCHRONOUSLY) THAT AN EVENT MUST BE DISPATCHED    601

DETERMINE PRIORITY QUEUE TO SOURCE THE EVENT FROM BASED ON A PRE-CONFIGURED POLICY    603

RETRIEVE EVENT FROM PRIORITY QUEUE AND DISPATCH IT    605

PHYSICAL DEVICES AND
PHYSICAL CONNECTIVITY

NETWORK FUNCTION
VIRTUALIZATION (NFV)

SPECIAL PURPOSE
HARDWARE

SPECIAL PURPOSE NETWORK DEVICE   702

GENERAL PURPOSE (COTS)
NETWORK DEVICE 704

HYBRID
NETWORK
DEVICE
706

VIRTUAL NETWORK
ELEMENT(S)
760A  •••  760R

ND
CONTROL
PLANE
724

VIRTUAL NETWORK
ELEMENT(S)
760A  •••  760R

722

NETWORKING SOFTWARE INSTANCE(S)

CONTROL
COMMUNICATION
AND CONFIG. MOD.
732A

732R

762A

762R

APP(S)
764A

APP(S)
764R

SOFTWARE INSTANCE(S)

FORWARDING
TABLE(S) 734A

734R

COMPUTE RESOURCE(S)
712

752

VIRTUALIZATION LAYER
754

710

NETWORKING HARDWARE

FORWARDING RESOURCE(S)
714

PHYSICAL NIS   716

NON-TRANSITORY MACHINE
READABLE STORAGE MEDIA
718

NETWORKING SOFTWARE
720

765

ND FORWARDING PLANE

726

740

HARDWARE

PROCESSOR(S)
742

NIC(S)   744

PHYSICAL NIS   746

NON-TRANSITORY
MACHINE READABLE
STORAGE MEDIA
748

SOFTWARE
750

765

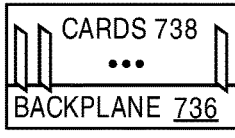

CARDS 738
•••
BACKPLANE 736

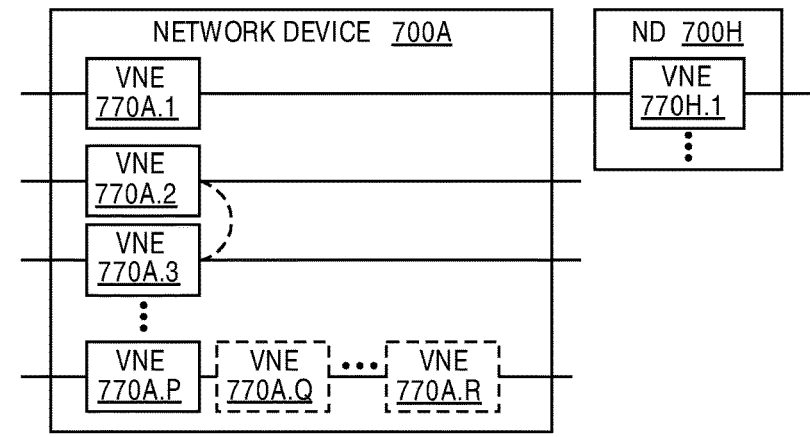

NETWORK DEVICE  700A

VNE 770A.1

VNE 770A.2

VNE 770A.3

VNE 770A.P    VNE 770A.Q  ....  VNE 770A.R

ND  700H

VNE 770H.1

FIG. 7D

CENTRALIZED APPROACH (SDN) 774

DISTRIBUTED APPROACH 772

...

APPLICATION(S) 788

APPLICATION LAYER 786

NORTH BOUND INTERFACE 784

VIRTUAL NETWORK(S) 792

CENTRALIZED CONTROL PLANE  776

NETWORK CONTROLLER 778

CENTRALIZED REACHABILITY AND FORWARDING INFO. MOD. 779

781

... SOUTH BOUND INTERFACE 782

DATA PLANE 780

SINGLE VNE 770T

ND  700A

VNE 770A.1

ND  700H

VNE 770H.1

METHODS FOR EVENT PRIORITIZATION IN NETWORK FUNCTION VIRTUALIZATION USING RULE-BASED FEEDBACK

CROSS-REFERENCE TO RELATED APPLICATIONS

This application is a national stage of International Application No. PCT/IB2019/050280, filed Jan. 14, 2019, which is hereby incorporated by reference.

TECHNICAL FIELD

Embodiments of the invention relate to the field of network function virtualization; and more specifically, to managing the prioritization of events related to network function virtualization.

BACKGROUND ART

Network function virtualization (NFV) is a technology that applies virtualization to the operation of network nodes. NFV can virtualize network device functions to separate them from the operation of a given network device and its hardware. The network device functions can then be executed local to or remote from the associated network device.

A virtualized network function, or VNF, may consist of one or more virtual machines running different software and processes, on top of a general computing system, a set of servers, switches, and/or storage devices. VNF can be distributed and implemented in a cloud computing environment. In this way the functions of a network node do not require having custom specialized hardware components to implement each network function.

VNF provides advantages in resource utilization that enable network functions to be executed in a location with more optimal use of resources within the network. For example, more complicated or resource intensive network functions can be executed at a data center instead of at a network device enabling the network device to utilize fewer resources and thereby reducing the component cost of the network device.

However, VNF creates additional communication overhead to relay data to and from the network device as the VNF functions are executed remotely. The additional infrastructure for managing VNF reduces some of the gains in computing efficiency and can increase bandwidth utilization in a network.

SUMMARY

In one embodiment, a method is implemented by an event collector to utilize feedback from an event handler to prioritize event forwarding to the event handler. The method includes receiving feedback from the event handler in response to a successful match-action in a rules engine, the feedback including a derived condition which is a generalized version of a condition stored in the match part of a rule, determining whether the derived condition is stored in an event prioritizer, and storing the derived condition in the event prioritizer with initial expiration timer and hit counter, in response to the derived condition not being present in the event prioritizer, and updating a hit counter and expiration timer of the derived condition in the event prioritizer, in response to the derived condition being present in the event prioritizer.

In another embodiment, a computing device implements a method of an event collector to utilize feedback from an event handler to prioritize event forwarding to the event handler. The computing device includes a non-transitory machine-readable medium having stored therein the event collector, and a processor coupled to the non-transitory machine-readable medium. The processor executes the event collector. The event collector receives feedback from the event handler in response to a successful match-action in a rules engine. The feedback includes a derived condition which is a generalized version of a condition stored in the match part of a rule. The event collector determines whether the derived condition is stored in an event prioritizer, stores the derived condition in the event prioritizer with initial expiration timer and hit counter, in response to the derived condition not being present in the event prioritizer, and updates the hit counter and the expiration timer of the derived condition in the event prioritizer, in response to the derived condition being present in the event prioritizer.

BRIEF DESCRIPTION OF THE DRAWINGS

The invention may best be understood by referring to the following description and accompanying drawings that are used to illustrate embodiments of the invention. In the drawings:

FIG. 5 is a diagram of one embodiment of a process for event handling.

FIG. 7A illustrates connectivity between network devices (NDs) within an exemplary network, as well as three exemplary implementations of the NDs, according to some embodiments of the invention.

FIG. 7B illustrates an exemplary way to implement a special-purpose network device according to some embodiments of the invention.

FIG. 7C illustrates various exemplary ways in which virtual network elements (VNEs) may be coupled according to some embodiments of the invention.

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs implements a single NE, but a centralized control plane has abstracted multiple of the NEs in different NDs into (to represent) a single NE in one of the virtual network(s), according to some embodiments of the invention.

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
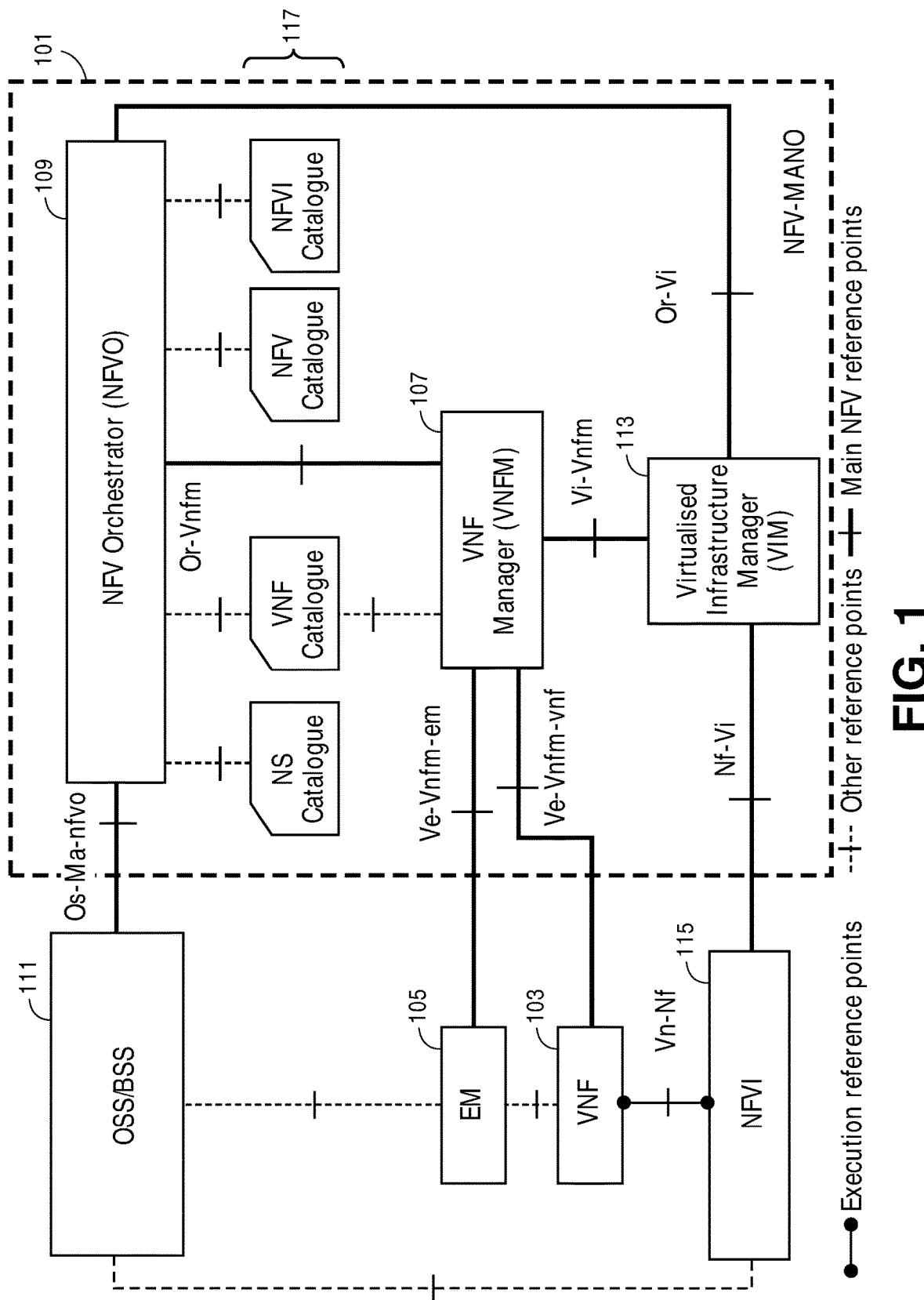
FIG. 1 is a diagram of one embodiment of a network function virtualization architecture.

The following description describes methods and apparatus for improving the operation of event handling for network function virtualization. The improved event handling includes a method by which an event collector gathers feedback from an external event handler to create a data structure that is used to prioritize event forwarding to the same event handler. Feedback from the event handler is sent to the event collector upon a successful match-action in a rules engine. The feedback contains a generalized version of the condition stored in the match part of a rule. The event collector stores these generalized conditions in a data structure (e.g., an event prioritizer), along with expiration timers and hit counters for each entry. In some embodiments, expiration timers may not be utilized. Expiration timers are reset when the same generalized condition is received more than once. Hit counters are increased each time the generalized condition is received. The event collector may keep the size of this data structure limited to a certain number of generalized conditions, using the expiration timers or other means to achieve this. The event collector uses the sum, mean, median, mode, or similar function of the hit counters for all generalized conditions in the event prioritizer matching an event to determine the priority of that event. The event collector keeps the incoming events in priority queues for internal processing or external dispatching, using event priority assigned by the event prioritizer to determine the order in which the events are dequeued and processed/forwarded (e.g., the higher the priority, the sooner the event is processed/forwarded).

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram of one embodiment of a network function virtualization architecture. The illustrated network function virtualization (NFV) architecture is provided by way of example to illustrate a context for the embodiments. The NFV architecture includes an NFV management and orchestration (NFV MANO) architecture (e.g., the NFV MANO defined by the European Telecommunications Standards Institute (ETSI) NFV working group). The NFV MANO organizes the life-cycle management of virtual network functions (VNFs) in cloud and similar computing environments.

The NFV MANO is organized with different functional blocks. Events are used by different functional blocks to determine the actions to be taken using the available virtualized resources. An event can be any message that conveys some indicator-related data (e.g.: VNF load is at 50%, memory consumption is at 95% of capacity, or similar information).

The NFV MANO 101 manages VNFs 103 and associated components. These components include element management (EM) 105. The EM 105 provides configuration, fault management, accounting, collection and security for a VNF 103. The EM 105 can receive events and other information relevant to its tasks from the VNF manager (VNFM) 107 that relate to the underlying virtualized resources. The EM 104 sends events to the VNFM 107 based on data collected from the VNF 103.

The VNFM 107 manages the lifecycle of one or more VNF instances 103. The VNFM receives events from the underlying infrastructure (e.g., from one or more virtualized infrastructure managers (VIMs) 113) and from the EM 105 with information related to the VNFs 103. The VNFM 107 can also use this information to take actions (e.g.: healing, scaling, and configuration).

The Network Function Virtualization Orchestrator (NFVO) 109 manages and orchestrates the network services, which includes one or more VNFs 103 and the connectivity between them. In some embodiments, policies govern the NFVO behavior. The NFVO can receive events from the VNFM 107 and take actions considering rules defined by the operations support systems/business support systems (OSS/BSS) layer 111. These functional blocks of the NFV architecture are connected through reference points (e.g., a representation state transfer (REST) interface). NFV events may occur in the VNF 103, or in its underlying (virtualized) infrastructure. For example, NFV events can be transported through the Ve-Vnfm reference point, which can be split into Ve-Vnfm-em and Ve-Vnfm-vnf.

The reference points, such as the Ve-Vnfm reference point, describes a set of application programming interfaces (APIs). For example, five APIs may service the Ve-Vnfm reference point, of which three of these APIs may generate VNF events. In this example, a performance management event can be generated from the VNFM 107 to the EM 105, a fault management event from the VNFM 107 to the EM 105, and an indicator from the EM 105 or VNF 103 to the VNFM 107.

The Or-Vnfm reference point defines how event information collected via the Ve-Vnfm reference point is sent to the NFVO 109. The VNFM 107 may do some aggregation or correlation and then forward this event information to the NFVO 109 via the Or-Vnfm reference point. The VNFM 107 can be considered to behave as a proxy for events from the underlying VNFs 103 and VNFI 113. Thus, the NFV MANO allows for event notifications to flow in different directions to different components (e.g.: from the VNFM 107 to EM 105, from the EM 105 to VNFM 107, from the VNFM 107 to the NFVO 109 and similar event movements). This means that more centralized components (e.g.: NFVO 109) may end up receiving a great volume of events from different orchestrated resources (e.g.: VNFs 103, network services, network function virtualization infrastructure (NFVI) 115 resources).

The NFVO 109 can utilize policies or rules to determine reaction to changes in network conditions. The enforcement of these policies and rules can be done by a rule engine. The rules engine works by checking conditions (e.g.: when an event or some other trigger happens) and taking actions when the condition is satisfied. Rules can evolve to be complex and interdependent. In some embodiments, the NFVO 109 includes a unified event collection and streaming implementation called VNF Event Streaming (VES).

The NFVI 115 is composed of points of presence where VNFs 103 are deployed. NFVI 115 works with the VNFs 103 and VIMs 113 to provide the resources for the VNFs 103 to execute. NFVI 115 provides a virtualization layer over the hardware to abstract hardware resources that can be utilized by the VNFs 103. The hardware resources can be distributed over multiple computing or networking devices.

The NFV architecture present several problems for event handling. An NFV entity that collects events from many sources (e.g.: VNFM) 107 will typically receive and aggregate many events for its managed resources (e.g.: VNFs 103/Ems 105 and VIMs 113). These events may be of a considerable volume in larger NFV infrastructures. It is in the best interest of service providers to maximize the handling capability of such events, optimizing the response time, that is, reducing the time between an event happens and orchestration decisions are taken based on its information. However, current NFV architecture is unable to this goal. The embodiments achieve the goal, such that important events are prioritized and forwarded from the event collector (e.g.: VNFM 107) to the event handler (e.g.: NFVO 109).

In addition, networks and network infrastructure are dynamic. Orchestration rules (or policies) may often shift in the network infrastructure, causing events that are relevant at one time to be less relevant at a subsequent time. Thus, pre-assigning static priorities to events on the VNFM 107 is not ideal, since the system would not be able to respond to environmental changes dynamically (e.g.: a given type of event becomes more relevant with a change in orchestration policies). The existing NFV MANO framework does not provide a prioritization scheme for events.

The embodiments overcome the limitations of the art and address the above-mentioned issues. The embodiments provide a method in which an event handler (e.g.: NFVO 109) guides the event collector (e.g.: VNFM 107) on which events lead to decisions in the network and instructing (or hinting) at what event types should be prioritized. This hinting is based on matched rules in a rules engine, which the event handler can utilize. For example, an NFVO 109 may receive a large number of events about bandwidth utilization from all VNFs 103 through the VNFM 107, but they are only relevant (e.g.: used for scaling-up/down) for a given type of VNF X in region Y.

To solve the forwarding priority, the embodiments provide a priority queue. The priority queues may be implemented in any form (e.g., using a heap-based data structure). The event collector and the event handler interaction may be brokered by the configurable priority queue to help forward important events first. Event priority will be assigned in the event collector based on information relayed by the event handler, and higher priority events are processed (and optionally aggregated/correlated) and forwarded first.

To address dynamic environments with changing rules, the embodiments provide a mechanism in which the event handler is constantly providing hints (feedback) to the event collector, so that the priority queues can auto-adjust. This feedback is generated in the event handler, based on conditions obtained from the rules engine when actions are taken for a given rule. In other words, whenever a rule is used (matched) because of an event, the event collector is informed about this so that it can tune its behavior. The event collector will keep a data structure responsible for matching incoming events and assigning priorities to them.

The embodiments provide advantages over the prior art. The embodiments enable an NFV system to dynamically prioritize events, based on the use of rules engines. The advantages include reduced response times for important events in the network; adaptability to changing network conditions, so that the prioritization does not become obsolete; low overhead, since the embodiments use low complexity and optimized data structures and algorithms instead of more complex, harder to implement learning systems.

Figure 2:
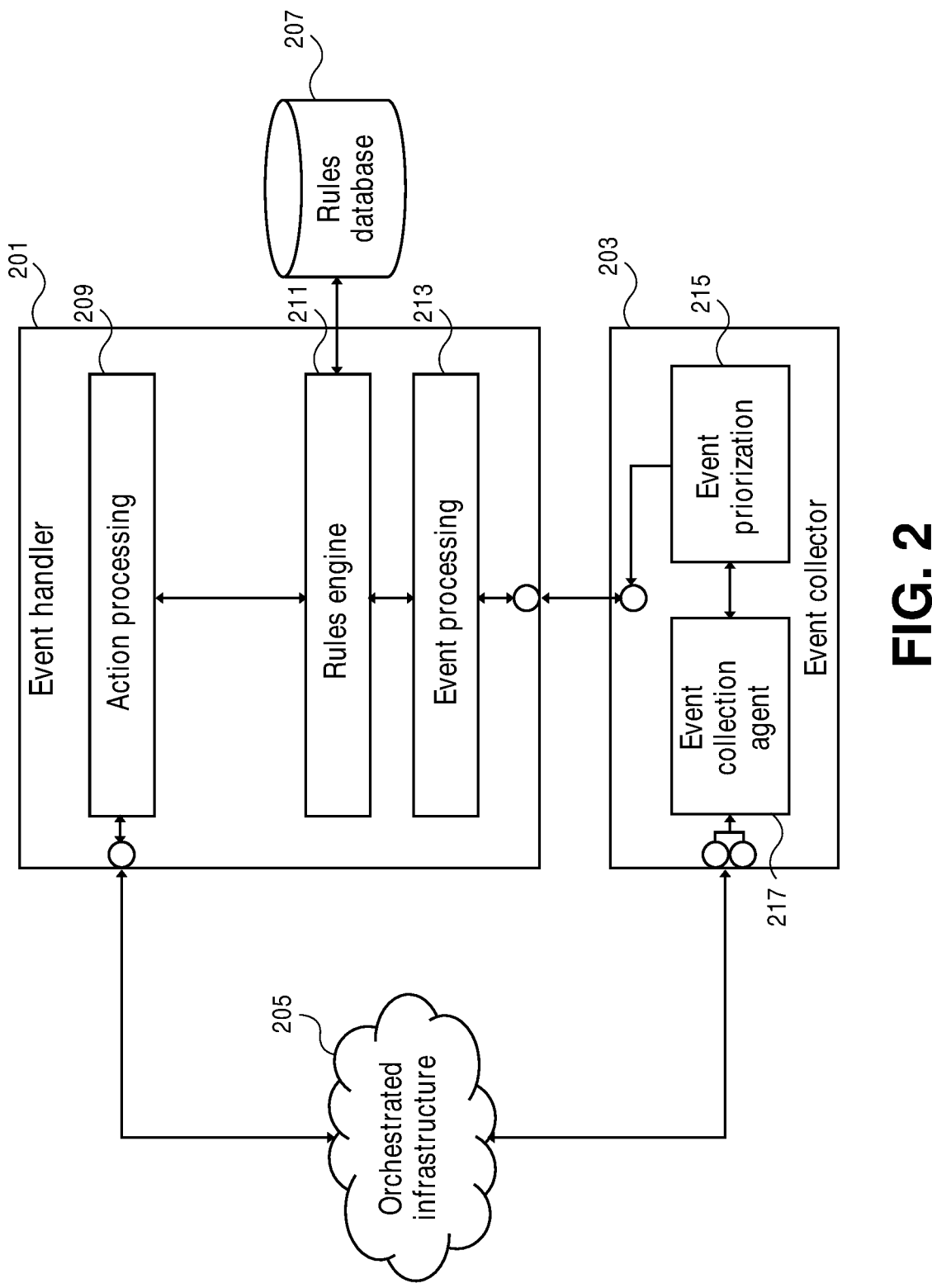
FIG. 2 is a block diagram of one embodiment of the event handler and event collector.

FIG. 2 is a block diagram of one embodiment of the event handler and event collector. The diagram illustrates the relationship between the elements of the event handler 201 and the event collector 203 as well as other components. The event handler 201 and the event collector 203 can be any event handling component and any event collecting component in the NFV architecture. These components can be in communication with the other components of the NFV architecture via the orchestrated infrastructure 205.

The event handler 201 includes an action processing component 209, a rules engine 211, and an event processing component 213. The operation of these components is described herein below with relation to FIGS. 3-6. The rules engine 211 is in communication with a rules database 207 which can have any format and be any type of database capable of storing and retrieving rules to be applied by the rules engine 211. These rules can define a set of criteria for a correlated action or set of actions to be taken. A 'set,' as used herein, refers to any positive whole number of items including one item. Rules can encompass policies defined by a system administrator, derived conditions as discussed herein and similar types of rules. The event collector 203 includes an event collection component 217 and an event prioritization component 215. Similarly, the operation of these components is described herein below with relation to FIGS. 3-6.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The components of the NFV architecture that function as the even handler device 201 and the event collector 203 can be implemented at specific computing or network devices or can be implemented in a cloud computing environment. All functions and components may be subject to virtualization (e.g.: the NFVO can run in a separate node from the VNFM). This does not alter the inner working of the embodiment but may have an impact on how the interfaces implementing the reference points are implemented (e.g.: a remote REST interface vs. direct function calls).

Figure 3:
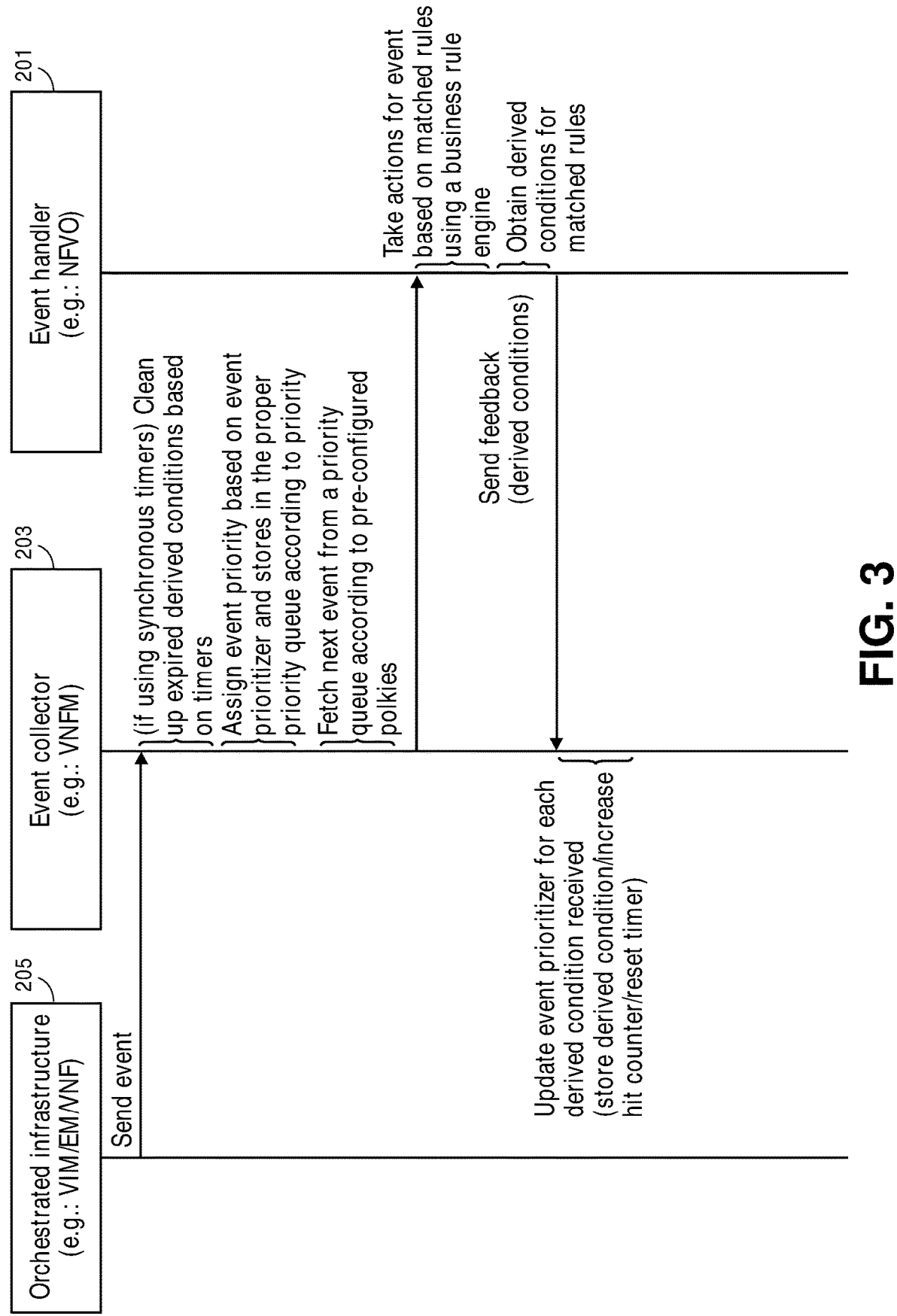
FIG. 3 is a diagram of one example embodiment of a process sequence between the orchestrated infrastructure 205, event collector 203, and an event handler 201.

FIG. 3 is a diagram of one example embodiment of a process sequence between the orchestrated infrastructure 205, event collector 203, and an event handler 201. The process of the embodiments can be initiated in response to the orchestrated infrastructure 205 generating an event that is sent initially to an event collector 203. The event collector 203 can clean up expired or derived conditions based on timers, assign event priority based on event prioritizer, and store the event in the proper priority queue. The event collector retrieves a next event from the priority queue and dispatches the event to the event handler 201. The event handler 201 processes the event based on matched rules determined by the rules engine. The event handler 201 can also determine derived conditions for the matched rules and provide this as feedback to the event collector 203. The event collector 203 then updates event prioritization for the derived condition. This sequence is described in greater detail with reference to FIGS. 4-6.

Figure 4:
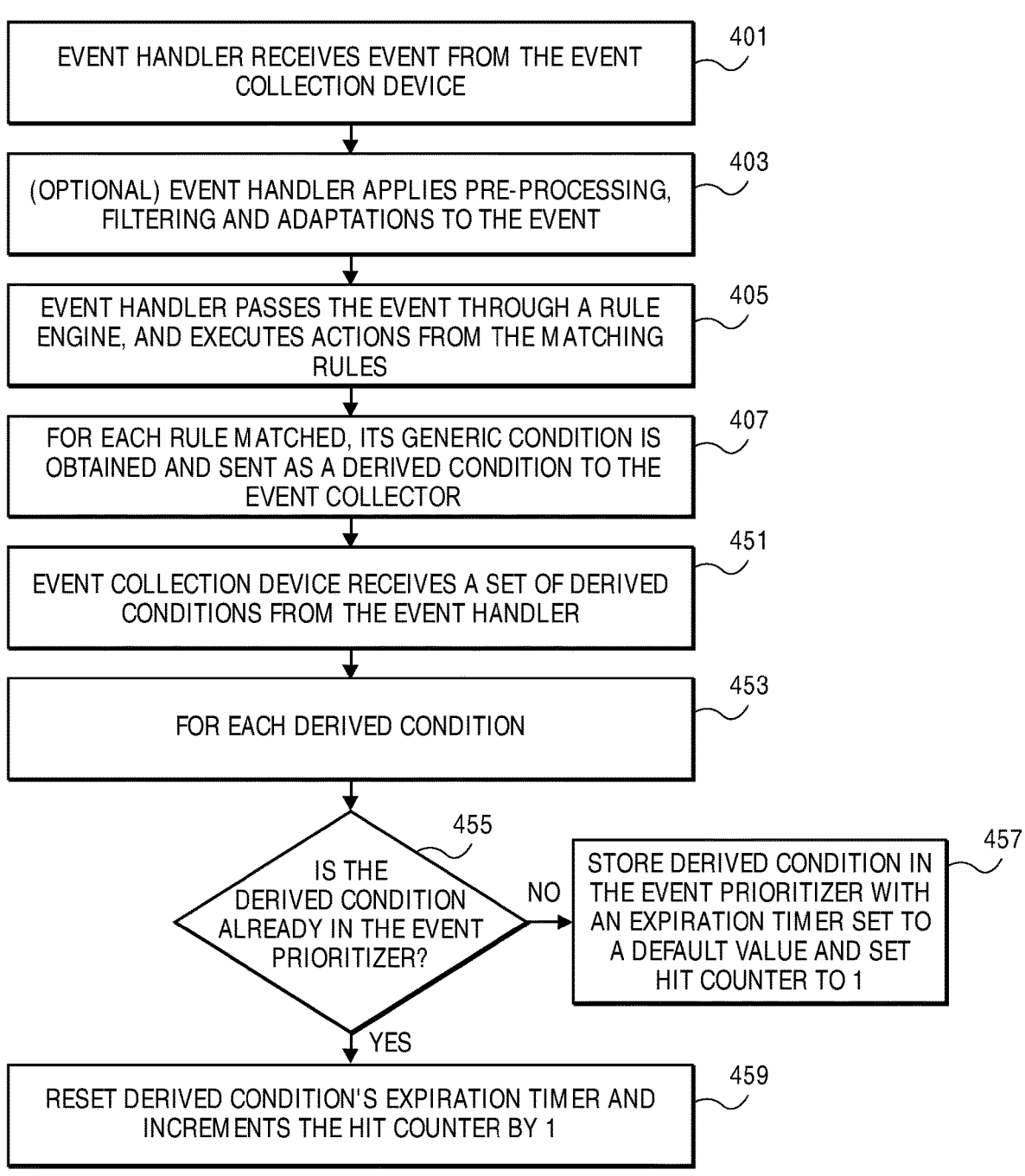
FIG. 4 is a diagram of one embodiment of a process of the event handler and event collector device.

FIG. 4 is a diagram of one embodiment of a process of the event handler and event collector device. The event handler operates in response to receiving an event and performs an action on this event (Block 401). The event handler can be any component of the NFV architecture that is capable of processing events. Similarly, the event collector can be any component of the NFV architecture capable of generating and/or collecting and forwarding events. In some embodiments, the event handler applies pre-processing of the received event (Block 403). Pre-processing of events can include filtering events, adapting or modifying events or similar actions that can be applied to all events or certain events based on type, origin or similar criteria.

The event handler (e.g., an NFVO) processes an event from the event collector (e.g., VNFM), and based on processing of the event by a rules engine, decides to take an action in the network based on that event if the event matched one or more rules (Block 405). For example, the NFVO may have decided to scale-up a VNF (i.e.: create another instance of the VNF), because the NFVO received an event that triggered a rule's action. A rule will be composed of a match condition, and an action, because the NFVO implements a rules engine that has a defined set of rules to be applied to received events. In one example, the rule could be "if one VNF in region X has 5 or more observations of more than 85% of CPU usage (condition), another instance of the same VNF is to be created (action)."

In addition, the event handler sends feedback to the event collector (Block 407). For example, every time the NFVO uses an event to take an action, the NFVO can send back to the VNFM a special derivation of the condition of the rule that was matched. This feedback information is referred to herein as a "derived condition" that can match incoming events from the VNFs and the VIMs. This derived condition may be pre-configured for each rule, or it may be obtained by a heuristic that transforms the original condition into its derived form, for example, by removing scalars and aggregation information from the original condition.

Continuing the previous example above, the original condition used by the NFVO is "if one VNF in region X has 5 or more observations of more than 85% of CPU usage." The derived condition in this case is then "if event is about CPU usage of a VNF in region X." In other words, scalar conditional elements ("more than 85% of usage") and aggregation/correlation elements ("has 5 or more observations") were removed from the original condition, so that only a generic condition is derived. In some embodiments, this derived condition is also pre-configured by an operator for every rule, so that no derivation process is necessary. The method of derivation can have different characteristics depending on the NFV architectural environment and the operator's intent.

The event collector manages the feedback received from the event handler (Block 451). The event collector can store the derived condition with a hit counter and an expiration timer in a data structure called the event prioritizer. The type of this data structure may include, but is not limited to, a list of derived conditions, a managed tree structure, or similar data structure. This data structure enables the event collector to assess whether an incoming event matches a pattern seen before, based on feedback and configuration from the event handler.

The implementation of the expiration timer can be dependent on the architecture of the event collector. If an event-driven architecture is used, the expiration time can be a timer registered in an event loop. In other architectures, a time-stamp-based mechanism may be used for skipping and removing derived conditions upon verification when an event is received, or for periodically cleaning up the event prioritizer. By means of this expiration timer, the event prioritizer acts as a time-aware least recently used cache (TLRU). In some embodiments, the event prioritizer can also be limited to a certain size, to avoid costly lookups that could compromise performance. Hit counter values obtained from the event prioritizer are used to determine the priority of an event. The events themselves are stored in the priority queue, as described further herein below.

The event collector also manages rule renewal and expiration using the event prioritizer. When the event collector receives a derived condition from the event handler (Block 453), the event collector checks whether the derived condition is already stored in the event prioritizer (Block 455). If a derived condition does exist in the event prioritizer, then its expiration timer is reset and the hit counter is increased (Block 459). If the derived condition is not present in the event prioritizer, then the derived condition is added to the event prioritizer and the expiration timer is set to a default value and the hit counter is set to one (Block 457).

Rules whose expiration timer is reached are removed. This makes the system behavior dynamic. The expiration timer mechanism guarantees that the event prioritizer does not become overloaded or stale. In other embodiments, the event prioritizer can use other mechanisms to remove stale or unused rules.

FIG. 5 is a diagram of one embodiment of a process for event handling. The process can be trigger in response to a new event being received by the event collector (Block 501). When new events occur in the NFV architecture and are received by the event collector they are matched against a set of derived conditions stored in the event prioritizer by the event collection agent (Block 503). If the received event matches a derived condition or similar rules stored in the event prioritizer (e.g.: a CPU notification from a VNF in region X), the hit counter associated with that derived condition is used to determine the priority of the event. If an event matches more than one derived condition or rule, then the value used for the prioritization is a function of the counters of all matched rules (Block 505). The function can be a sum of the counters, a mean, a median, a mode or similar function applied to the counters to derive an event priority value.

The received event is then to be stored in one of a set of priority queues (Block 509). The priority queues can be a heap-like data structure that is sorted by the priority value that is assigned to the event. The priority queue can be used for picking the next event to be processed either for internal purposes of the event collector (e.g., aggregation/correlation), or for the eventual dispatch to the event handler.

More than one priority queue can be in use in the event collecting device at a time for any purposes as long as the priority of stored events is based on the output of the event prioritizer, and as long as these priority queues have a strict order (e.g.: events in queue A are always served before those from queue B). The event collection agent determines which of the available priority queues to place an event in based on any configurable criteria (Block 507). In one example, multiple priority queues can be utilized to avoid event starvation. If only high-priority events are handled, low priority ones may never be processed. An event collector may choose to dedicate part of the time (e.g.: 70%) to deal with high-priority events in one queue, and a smaller amount of time (e.g.: 30%) to dedicate to low-priority events stored in another queue.

Figure 6:
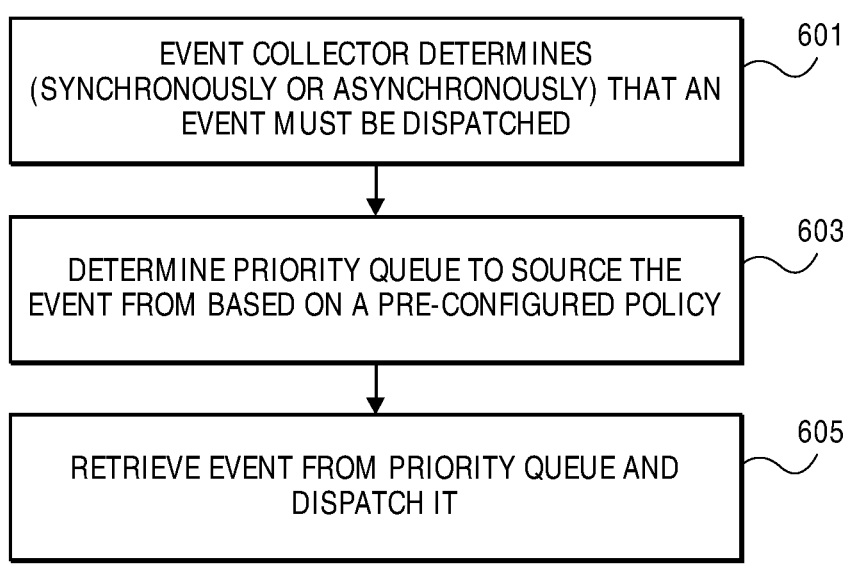
FIG. 6 is a diagram of one embodiment of the operation of the event collector to forward events.

FIG. 6 is a diagram of one embodiment of the operation of the event collector to forward events. When the event collector detects the need for sending an event (Block 601), then one of the priority queues is chosen (Block 603). In one example the event collector includes an asynchronous event loop that determines when it is time to send an event. In some cases, there is an explicit request from an event handler that is serviced by the event collector. In one example, the event collection agent can implement a pre-configured policy, such as the 70%-30% split mentioned in the above-example. The event collection agent selects the event with the highest priority from the selected priority queue and sends the selected event to the event handler (Block 605).

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general-purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). The networking software 720 can include the event handler and/or event collector 765 as described herein as part of the NFV software and infrastructure.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general-purpose network device 704 includes hardware 740 comprising a set of one or more processor(s) 742 (which are often COTS processors) and physical NIs 746, as well as non-transitory machine-readable storage media 748 having stored therein software 750. During operation, the processor(s) 742 execute the software 750 to instantiate one or more sets of one or more applications 764A-R. The software 750 can include the event handler and/or event collector 765 as described herein as part of the NFV software and infrastructure. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s)

752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multiprotocol Label Switching (GMPLS) Signaling RSVP-TE))

that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general-purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach). The centralized control plane 776 can include the event handler and/or event collector 781 as described herein or aspects thereof as part of the NFV software and infrastructure that is managed by the centralized control plane 776.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general-purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774 but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively, or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
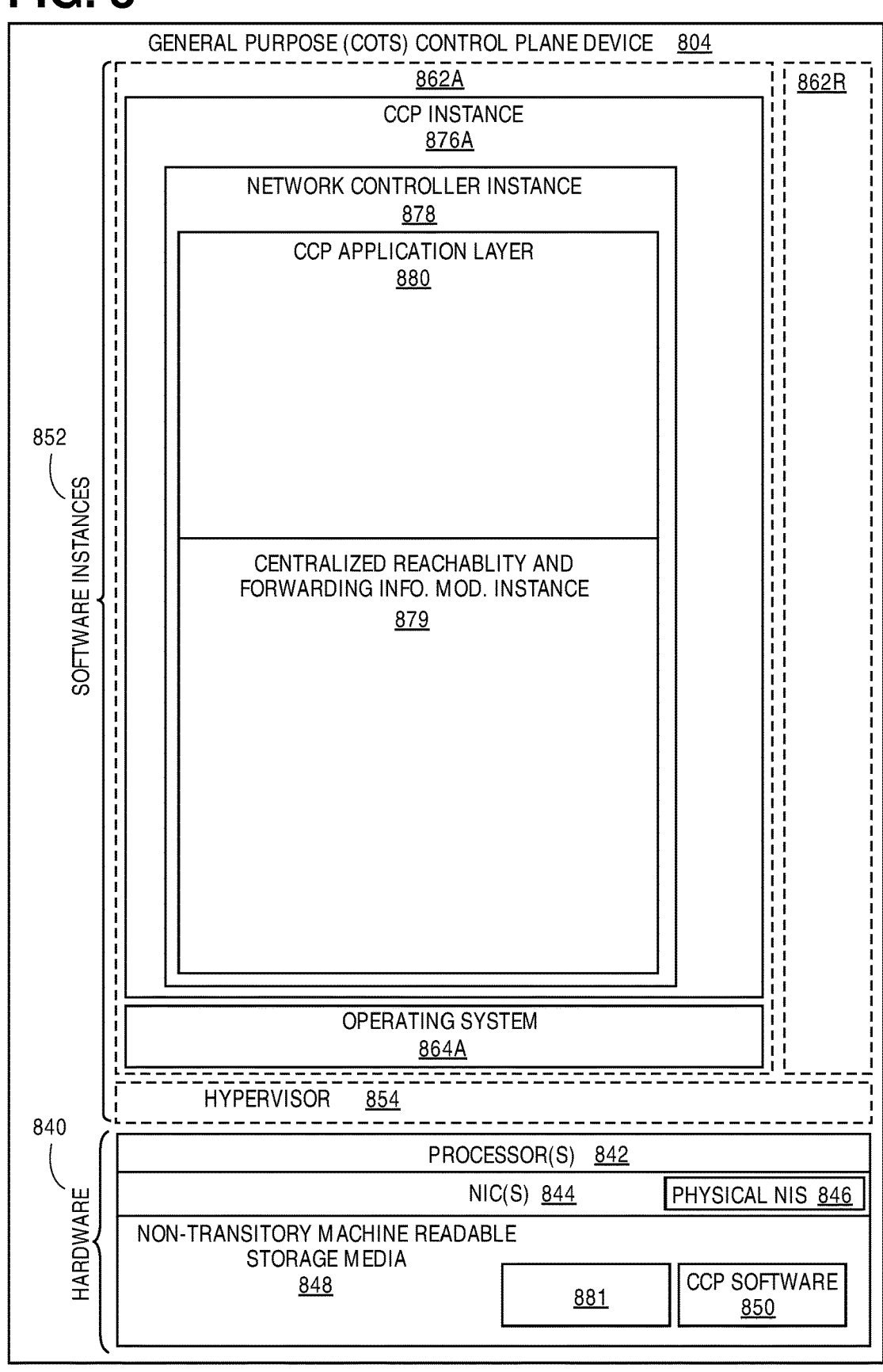
FIG. 8 illustrates a general-purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general-purpose control plane device 804 including hardware 840 comprising a set of one or more processor(s) 842 (which are often COTS processors) and physical NIs 846, as well as non-transitory machine-readable storage media 848 having stored therein centralized control plane (CCP) software 850. The non-transitory machine readable storage media can store the event handler and/or event collector 881 as described herein as part of the NFV software and infrastructure.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by an event collector to utilize feedback from an event handler to prioritize event forwarding to the event handler in a network function virtualization, NFV, architecture, the method comprising:

receiving feedback from the event handler in response to a successful match-action in a rules engine, the event handler being an NFV orchestrator, NFVO, the feedback including a derived condition which is a generalized version of a condition stored in a match part of a rule;

determining whether the derived condition is stored in an event prioritizer;

determining whether an incoming event matches a previously seen pattern based on: a configuration of the event prioritizer, the feedback from the event handler, and a configuration from the event handler, determining that the incoming event matches a previously seen pattern establishing that the derived condition is present in the event prioritizer;

storing the derived condition in the event prioritizer with initial expiration timer and hit counter in response to the derived condition not being present in the event prioritizer, the expiration timer being set to a default value and the hit counter being set to one;

updating the hit counter and expiration timer of the derived condition in the event prioritizer, in response to the derived condition being present in the event prioritizer, the expiration timer being reset and the hit counter being increased; and storing received events in one of a set of priority queues to be dispatched to the event handler, the event collector being a virtual network function manager, VNFM, the event collector determining which of the available set of priority queues to place an event in based on a pre-configured policy.

2. The method of claim 1, further comprising:

resetting an expiration timer of a derived condition in response to receiving a subsequent occurrence of the derived condition.

3. The method of claim 2, further comprising:

incrementing the hit counter in response to receiving the subsequent occurrence of the derived condition.

4. The method of claim 1, further comprising:

prioritizing received events using a priority value based on matching derived conditions.

5. The method of claim 4, wherein the priority value is a sum, median, mean, or mode of the hit counter of the matching derived conditions.

6. The method of claim 1, further comprising:

processing an event by a rules engine and executing actions matching the event.

7. The method of claim 6, further comprising:

determining the derived condition for a matched rule.

8. A computing device to implement a method of an event collector to utilize feedback from an event handler to prioritize event forwarding to the event handler in a network function virtualization, NFV, architecture, the computing device comprising:

a non-transitory machine-readable medium having stored therein the event collector and the event handler, the event handler being an NFV orchestrator, NFVO, the event collector being a virtual network function manager, VNFM, the event handler being adapted to determine a priority queue to source a next event from using a pre-configured policy, and to forward the next event from the priority queue, the event handler processing an event by a rules engine and executing actions matching the event, the event handler further determining the derived condition for a matched rule; and a processor coupled to the non-transitory machine-readable medium, the processor configured to execute the event collector;

the event collector configured to:

receive feedback from the event handler in response to a successful match-action in a rules engine, the feedback including a derived condition that is a generalized version of a condition stored in a match part of a rule;

determine whether the derived condition is stored in an event prioritizer;

determine whether an incoming event matches a previously seen pattern based on: a configuration of the event prioritizer, the feedback from the event handler, and a configuration from the event handler, determining that the incoming event matches a previously seen pattern establishing that the derived condition is present in the event prioritizer;

store the derived condition in the event prioritizer with initial expiration timer and hit counter in response to the derived condition not being present in the event prioritizer, the expiration timer being set to a default value and the hit counter being set to one; and update the hit counter and the expiration timer of the derived condition in the event prioritizer in response to the derived condition being present in the event prioritizer, the expiration timer being reset and the hit counter being increased, the event collector storing received events in one of a set of priority queues to be dispatched to the event handler, the event collector determining which of the available set of priority queues to place an event in based on a pre-configured policy.

9. The computing device of claim 8, wherein the event collector resets an expiration timer of a derived condition in response to receiving a subsequent occurrence of the derived condition.

10. The computing device of claim 9, wherein the event collector increments the hit counter in response to receiving the subsequent occurrence of the derived condition.

11. The computing device of claim 8, wherein the event collector prioritizes received events using a priority value based on matching derived conditions.

12. The computing device of claim 11, wherein the priority value is a sum, median, mean, or mode of the hit counter of the matching derived conditions.

* * * * *